March 2, 1943.　　A. J. WILLIAMS, JR　　2,312,945
MEASURING SYSTEMS
Filed March 2, 1937　　3 Sheets-Sheet 1

INVENTOR.
Albert J. Williams Jr.

Cornelius D. Ehret
ATTORNEY.

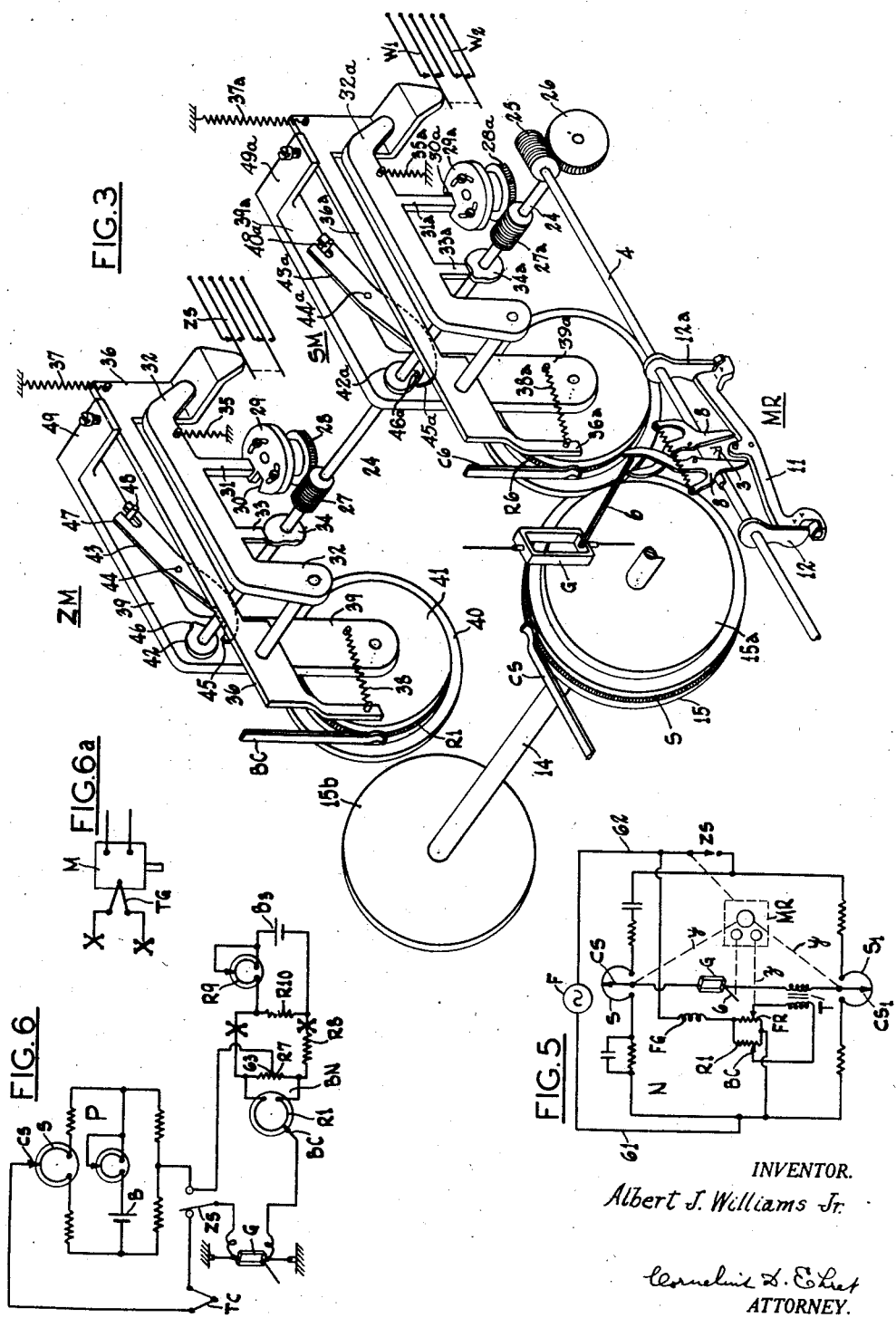

March 2, 1943.  A. J. WILLIAMS, JR  2,312,945
MEASURING SYSTEMS
Filed March 2, 1937  3 Sheets-Sheet 3
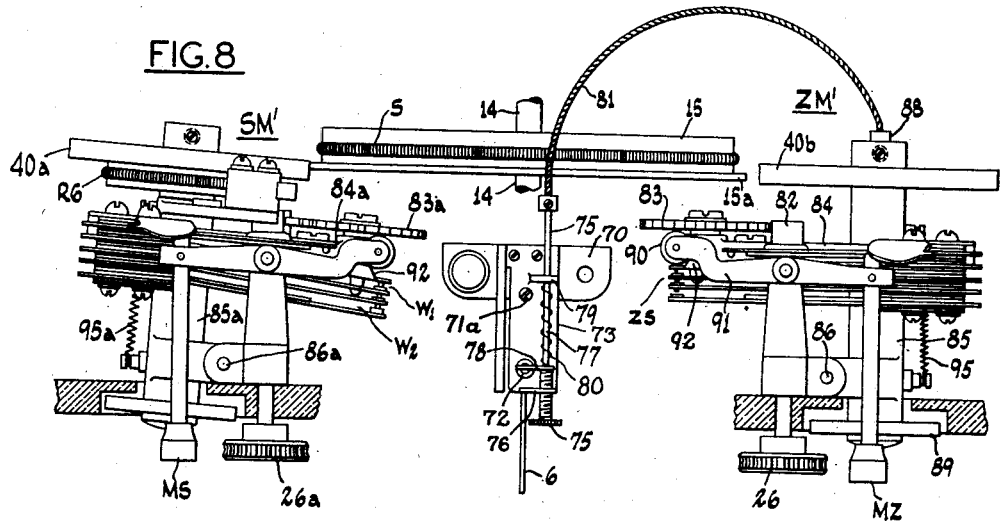
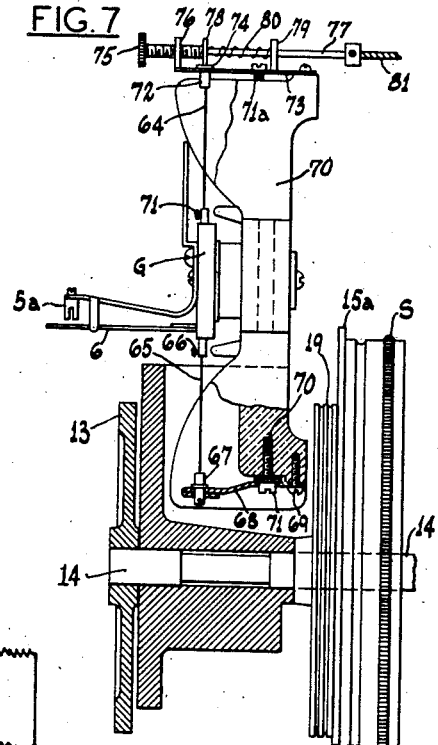
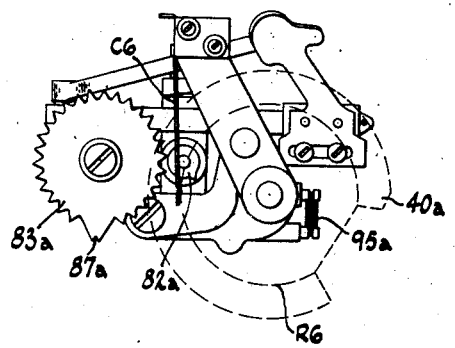
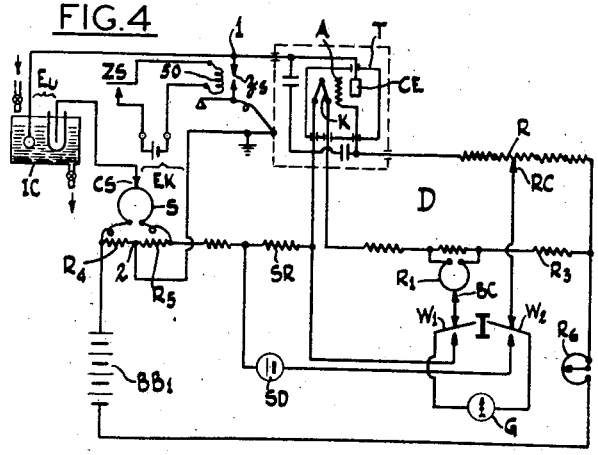
INVENTOR.
Albert J. Williams Jr.
Cornelius L. Ehret
ATTORNEY.

Patented Mar. 2, 1943

2,312,945

UNITED STATES PATENT OFFICE 2,312,945

MEASURING SYSTEM

Albert J. Williams, Jr., Philadelphia, Pa., assignor to Leeds & Northrup Company, Philadelphia, Pa., a corporation of Pennsylvania Application March 2, 1937, Serial No. 128,636

44 Claims. (Cl. 175—183)

My invention relates to measuring systems including a detector, such as a galvanometer, a thermionic tube, or equivalent, for controlling, recording or indicating the magnitude or changes in magnitude of a condition, as temperature, pressure, voltage, or other mechanical, chemical, electrical, physical or other condition.

In general, detectors of high sensitivity used in measuring systems, particularly those involving null methods of measurement, are inherently subject to zero drift or shift. Consequently the measurements are based, not upon a constant, true zero, but upon a false, variable zero.

In accordance with my invention, there is provided means operable to prevent influence upon the detector of the condition under measurement, to ascertain the deviation from true zero of the detector while so free of influence by the condition under measurement, and automatically to reduce said deviation to restore the detector to its true zero; more specifically, relay mechanism (which may also have the function to adjust controlled structure, such as an indicator, recorder marker, a control valve or the like in accordance with response of the detector) controlled by the detector is utilized, while the detector is isolated from the variable condition under measurement, to readjust the detector to its true zero if there be any deviation therefrom.

In measuring systems in which the detecting means comprises a thermionic tube and an electro-responsive device, such as a galvanometer, in the output system thereof, means are provided intermittently or periodically to apply zero input of the measured condition to the tube and, during application of zero input, to adjust an impedance in the input or output system of the tube in sense and to extent effecting null response of said electro-responsive device.

In another form of my invention, the zero shift of an alternating current galvanometer is automatically corrected, as at suitable intervals, by applying zero input to the movable coil of the galvanometer and then varying a biasing current in the coil circuit until the deflecting member of the galvanometer assumes its true zero position; specifically, as in other forms of the invention, the impedance or other element adjustable to reset the zero of the galvanometer is, during the periods of zero input, coupled to relay mechanism responsive to deflection of the galvanometer from a neutral or true zero position to readjust the zero of the galvanometer to correspond to that neutral position.

In other forms of my invention, shift in the zero of a galvanometer is corrected, during the periods of zero input, by automatic adjustment of mechanical means utilized to bias the deflecting member of the galvanometer to its zero position; specifically, any deviation of the deflecting member from its true zero, during application of zero input, is effective to cause readjustment of the mechanical biasing means by action of relay mechanism normally utilized to actuate a controlled structure in accordance with the galvanometer's deflections.

My invention further resides in the methods and apparatus hereinafter described and claimed.

For an understanding of my invention and illustration of various forms thereof, reference is to be had to the accompanying drawings in which:

Fig. 1 diagrammatically represents a system utilizing a null method of measurement;

Figs. 2 and 3, in perspective, illustrate mechanical relay mechanism;

Figs. 4, 5 and 6 diagrammatically represent various systems utilizing null methods of measurement;

Fig. 6a discloses an arrangement for developing a zero-compensating voltage alternative to the arrangement specifically included in Fig. 6;

Figs. 7, 8 and 9 illustrate details of a modification of the invention;

Figure 1:
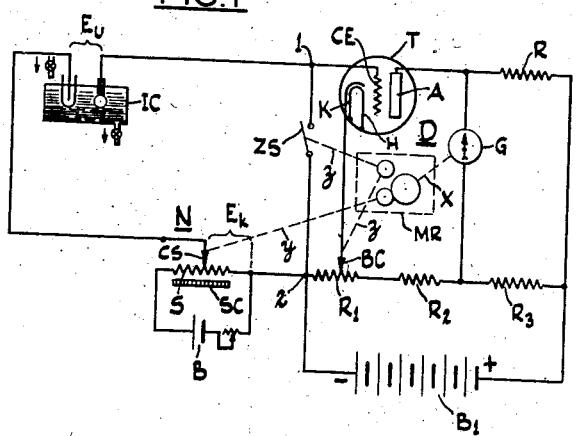

Referring to Fig. 1 as illustrative of systems utilizing a sensitive detector subject to zero drift, the measuring network N comprises a source of voltage $Ek$ connected in opposition to a source of voltage $Eu$ whose magnitude is to be determined; specifically, the source of voltage $Eu$ is an ion-concentration cell IC of the glass electrode type whose output voltage depends upon the hydrogen ion-concentration of the test solution in the cell. Preferably, and in the system illustrated, the source of voltage $Ek$ is a calibrated potentiometer slidewire S, supplied as by battery B, or equivalent, with constant current of known magnitude. When the setting of contact CS along slidewire S is such that voltage $Ek$ is equal to voltage $Eu$, there is no difference of voltage between terminals 1 and 2 of the system and the ion-concentration of the cell sample or any factor directly related to ion-concentration may be read from the calibrated slidewire scale SC. When these voltages are unbalanced, the unbalanced voltage is an input voltage applied to the terminals 1, 2 of detector D.

Accurately to determine whether or not the voltages $Ek$ and $Eu$ are balanced requires a detector having high sensitivity; in the system shown in Fig. 1, the detector D includes a thermionic tube T (such as Westinghouse type DRH 506 or General Electric type FP 54) whose control electrode CE is connected to terminal 1, whose anode A is connected to the positive terminal of a suitable source of current, as battery B1, or equivalent, through resistance R, and whose cathode K is connected to contact BC adjustable along resistance R1 which, in series with resistances R2, R3, is connected across the source of current B1. The negative terminal of resistance R1 is connected to terminal 2. The source of current for the cathode heating element H is not shown.

One terminal of galvanometer G is connected to the anode A of the tube, or suitable point along resistance R, and the other galvanometer terminal is connected between resistances R2 and R3. In effect, the detector D is a Wheatstone bridge, one of whose arms is the anode-cathode resistance of tube T, variable with change of potential of control electrode CE with respect to cathode K, and one of whose conjugate arms includes the galvanometer G.

To adjust or set the zero of detector D, the switch ZS is closed to reduce to zero any voltage difference existing between terminals 1 and 2, thus to simulate zero input of the measured condition. The setting of contact BC is then adjusted along resistance R1 until the biasing voltage applied to the control electrode CE is of such magnitude that there is null deflection of galvanometer G.

Switch ZS is thereupon opened and the system is in condition for precise measurement of voltage $Eu$.

In actual operation, the zero of the detector D does not remain at its true value but varies because of the effects of various conditions upon the circuit constants, the tube parameters, and/or upon the moving coil system of the galvanometer. It is therefore necessary, for accurate measurements, that the detector zero be checked and reset to true zero, if there be any deviation therefrom, before a measurement or series of measurements, or at frequent intervals during continuous measurement.

Particularly when the system is for continuously recording or controlling the condition under measurement, it is desirable that the resetting of the detector to its true zero be effected automatically at suitable intervals.

Figure 2:
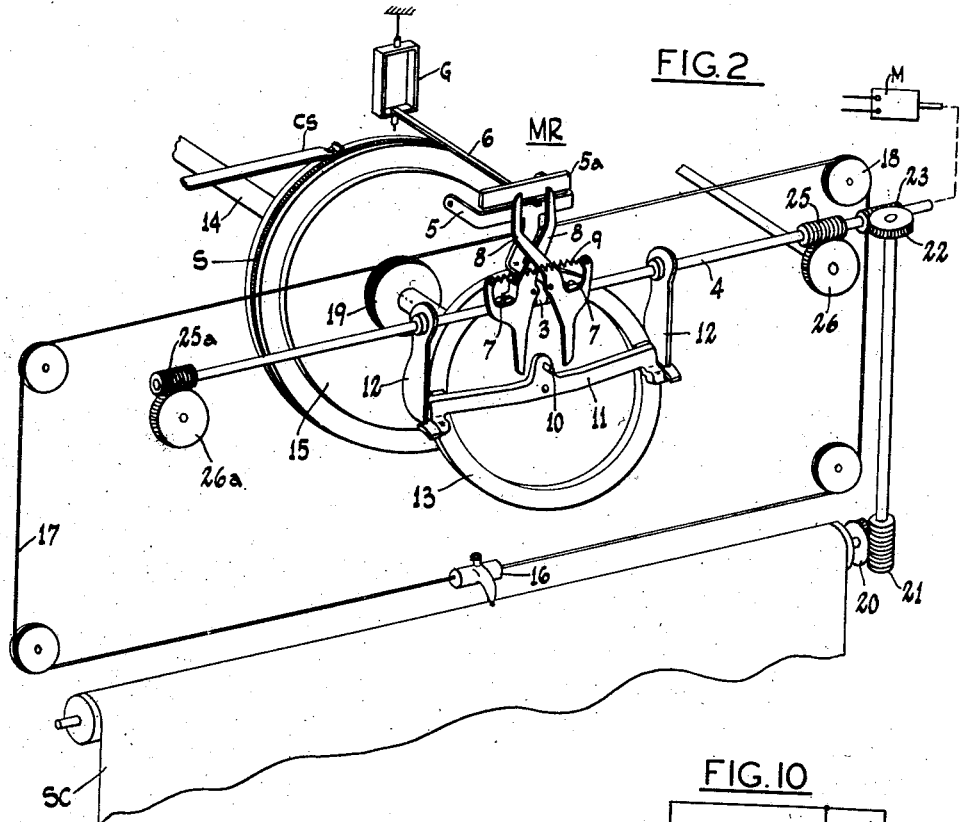

In Fig. 1, mechanical relay mechanism MR associated with the galvanometer G for automatically varying the magnitude of voltage $Ek$ to balance the voltage $Eu$ and for automatically resetting the detector to true zero is schematically illustrated; as indicated, a shaft $x$ associated with a galvanometer G is adapted to be coupled to the adjustable element of the potentiometer, as indicated by dotted line $y$, and to switch $zs$ and contact BC, as indicated by dotted lines $z$; specific constructional details of a mechanical relay suitable for this purpose are shown in Figs. 2 and 3.

Referring to Fig. 2, which shows the essential elements of a mechanical relay specifically of the type disclosed in Squibb U. S. Patent #1,935,-732, the galvanometer G of Fig. 1 is utilized to effect movement of contact CS relative to slidewire S normally to effect or maintain balance between voltages $Eu$ and $Ek$.

Briefly, the cam 3 on shaft 4 which is driven at constant speed by a suitable motor M periodically, or once per cycle of the mechanism, raises the bar 5 to clamp the pointer 6 of galvanometer G. The cams 7 on shaft 4 thereafter in the cycle release the feelers 8, 8a whose upper ends are biased toward each other by spring 9. If the pointer 6 is clamped away from its neutral or zero position, it is first engaged by one of feelers 8 and the lower end of the other feeler 8 engages the abutment 10 on clutch member 11 and rocks the clutch member through an angle about its shaft substantially proportional to the deviation of the pointer from its neutral position. Thereafter, in the cycle of the mechanism, the displaced clutch member 11 is moved by cam structure, not shown herein, into engagement with driven clutch member 13 and subsequently one or the other of cams 12 engages clutch member 11 and restores it to its neutral position shown in Fig. 2. During this movement the clutch members 11, 13 are in engagement and consequently shaft 14 of the driven clutch member 13 is moved through an angle substantially proportional to the galvanometer deflection and in a sense dependent upon the sense of the galvanometer deflection. These clutch members are disengaged before the pointer is again clamped and feelers 8, 8a are again released to set the driving clutch member.

Consequently, when the difference between voltages $Eu$ and $Ek$ is not zero, the galvanometer G is effective to adjust slidewire S which is on disk 15 secured to shaft 14 of the driven clutch member 13 until balance of these voltages is effected.

To record the variations in concentration or other condition under measurement, the marker or indicator 16, Fig. 2, is connected, as by cord 17, to drum 19 to shaft 14 so that the position of marker 16 with respect to the scale SC of the record sheet corresponds to the position of slidewire S with respect to its contact CS. The record sheet may be driven from shaft 4 through gearing 20, 21, 22, 23. The movement of shaft 14 may also be utilized, as known to the art, to operate control devices, as switches for operation of signals, or of motive devices controlling the condition under measurement. For more complete description and illustration of the recorder mechanism of Fig. 2, reference is made to the aforesaid Squibb patent.

The recorder mechanism as thus far described, and as shown in Fig. 2, does not automatically reset the detector D to true zero; auxiliary mechanism ZM (Fig. 3) for that purpose is now described.

The shaft 24 is driven at slow speed, as from shaft 4 through reduction gearing 25, 26; shaft 4 may, for example, be driven at 30 revolutions per minute and shaft 24 at 1 revolution per minute. Gear 27 on shaft 24 drives gear 28 to which is attached disk 29 having a slot or groove which, at suitable intervals, for example, about every forty-five minutes, moves into alignment with the pin 31 extending downwardly from lever 32 from which also extends the abutment 33 serving as a follower for cam 34 on shaft 24.

For each revolution of shaft 24, the lever 32 is released by cam 33 for clockwise movement under the influence of spring 35 but such movement is prevented or restricted by disk 29 until, after a predetermined number of revolutions, the notch 30 in disk 29 comes into alignment with pin 31, whereupon, when cam 34 releases arm 32 it is free to swing through a substantial angle and rock the pivoted member 36 against the weaker influence of its biasing spring 37.

This motion of member 36 is utilized to close the switch ZS of Fig. 1 thus to apply zero input to detector D or, in effect, to isolate it from the ion-concentration cell and potentiometer S. The extent of the low or depressed portion of cam 34 is such that arm 32 remains in its lowered position for a suitable number of revolutions of shaft 4, for example, about ten revolutions, corresponding to ten cycles of the pointer-clamping, the pointer-feeling, and the clutch mechanisms. Thus, for a corresponding period of time, there is zero signal input to detector D and if there has been no drift of the zero of the detector from true zero, the galvanometer pointer will be and remain in its neutral position for which the mechanical relay mechanism is ineffective to adjust shaft 14. If, however, there has been a drift of the zero of the detector D, the galvanometer G will, for zero input, deflect in one direction or the other from its neutral position depending upon the sense of the zero drift, and accordingly the mechanical relay mechanism will adjust shaft 14 in one direction or the other.

This movement of shaft 14 occurring while switch ZS is closed to apply zero signal input to the detector, is utilized to effect relative adjustment of contact BC of the biasing resistor R1, Fig. 1, by mechanism now described.

The clockwise movement of arm 36, effected by cam 34 and disk 29, as above described, tensions the spring 38 connected between arm 36 and a lever 39 which carries disk 40 whose periphery is normally out of engagement with the periphery of disk 15b secured to shaft 14, but which is engaged by disk 15b when lever 39 is rocked in clockwise direction from the position shown in Fig. 3. (Spring 35 is sufficiently strong to overcome both springs 37 and 38).

The slidewire or biasing resistance R1 is carried by disk 41 attached to or integral with disk 40; consequently, when lever 39 is in its deflected position with disk 40 in engagement with disk 15b, the galvanometer, if deflected from neutral position, effects through the mechanical relay mechanism MR adjustment of slidewire R1 relative to its contact BC in proper sense and to proper extent to restore the zero of the detector to true zero.

If the zero drift since the last zero reset period is small, one or two cycles of the relay mechanism, after closure of switch ZS, suffices to step the resistance R1 to its proper value for restoration of the true zero of the detector; greater drift requires more steps or cycles to restore true zero. The period of zero resetting should not be too long, for example, not greater than a minute, and is preferably less because, during this period, there is, of course, no measurement of the condition whose variations it is desired to record.

Preferably, the angular relation of cam 34 on shaft 24 to the cam 3 on shaft 4 is by construction or adjustment such that arm 32 is not released to close switch ZS or raised to open switch ZS until after the galvanometer pointer is clamped in the particular cycles involved at the beginning and end of the period of zero readjustment of the detector; consequently, violent swinging or deflection of the galvanometer pointer incident to opening or closing of switch ZS is prevented.

Preferably, the engagement of disk 40 with disk 15b on shaft 14 is not effected until after the driving clutch member 11 has been restored to its horizontal or neutral position; otherwise, the first step of adjustment of resistance R1 may not be in accord with the zero drift but erroneously in accord with the unbalance, if any, which existed between the voltages Eu, Ek when the galvanometer pointer was clamped. Such misadjustment would not affect the accuracy of the subsequent measurements because both it and the actual zero drift would be corrected during the remaining cycles of the zero resetting period during which the disk 40 remains in engagement with disk 15b. However, it is desirable that possibility of such temporary misadjustment of resistance R1 be avoided.

To that end, there is provided cam 42 on shaft 24 which engages lever 43 and prevents arm 39 from moving in response to tensioning of spring 38 by clockwise movement of arm 36, effected as above described, until one or the other of cams 12, 12a has restored the driving clutch member 11 to its neutral position, assuming it has been deflected therefrom previously in the cycle. The lever 43 is pivoted to the frame of the mechanism at 44; its arm 45 is curved for engagement with the projection 46 of cam 42, and its other arm 47 is forked to receive a pin 48 extending from lever 39.

At the end of the zero-reset period, of say ten cycles more or less, the cam 34 lifts the projection 31 of lever 32 out of notch 30 of disk 29 against the bias of spring 35; spring 37 is thereupon effective to restore lever 36 to its original position; the extension 49 of lever 39 is engaged by lever 36 during its upward movement and restored thereby to its original position. The counterclockwise movement of lever 39 moves the disk 40 out of engagement with disk 15b preventing any further adjustment of resistance R1 until the next zero reset period; the counterclockwise movement of lever 36 permits switch ZS to open again to permit application of input voltage to the detector. The timing is such the disk 40 disengages disk 15b after the last restoring action of cams 12 occurring in the zero-reset period and before the first restoring action of cams 12, 12a in the immediately following measuring period.

The zero drift occurring during any one measuring period is usually so small the movements of marker 16 incident to movements of shaft 14 occurring during the short zero-reset period are inconsequential; accordingly, it is not necessary to provide for decoupling of the marker from shaft 14 during the zero-reset period. The zero drift, if permitted to accumulate over a substantial period of time, would, however, result in inaccurate measurements.

The system shown in Fig. 4 is generally similar to that of Fig. 1. The unbalance between the voltage Eu of an ion-concentration cell, or equivalent device providing a voltage varying as a function of a condition under measurement, is balanced against a voltage Ek derived from a potentiometer slidewire and the unbalanced voltage is impressed upon terminals 1, 2 of a detector D comprising a thermionic tube T and a galvanometer G. In this system, the battery BB1, or other source of direct current, which supplies the standard current for the potentiometer slidewire S is also utilized to supply the various voltages applied to the electrodes of tube T.

The mechanism shown in Fig. 2 and described above may be utilized to effect adjustment of contact CS relative to slidewire S automatically in response to deflection of galvanometer G to balance voltage Ek against the cell voltage Eu and produce a record of the ion-concentration of the cell, or some characteristic related to ion-concentration, as acidity or alkalinity. If the solution may be either acid or alkaline, the terminal 2 should connect to a point, provided by resistors R4, R5, whose potential is intermediate the potentials of the slidewire terminals.

In this network, the resistance R1, adjustable to set the zero of the detector, is more positive than the cathode K of tube T and its contact BC is connected, during measurements and also during setting of the detector zero, to one terminal of galvanometer G whose other terminal is connected to a range contact RC adjustable along resistance R.

To set the detector D to its true zero, the switch zs is closed to prevent influence upon the detector of the condition under measurement and the contact BC of resistor R1 is then adjusted to obtain null deflection of galvanometer G. The opening and closing of switch zs and adjustment of slidewire R1 may be effected automatically at suitable intervals by the mechanism ZM shown in Fig. 3 and previously described. To avoid long leads in the input system of tube T which would pick up electrical disturbances affecting accuracy of the measurements, the switch zs is located near tube T and is operated by relay coil 50 whose energization is controlled by switch ZS located in the recorder unit, as appears in Fig. 3, for intermittent actuation by the recorder mechanism. The slidewire R1 of Fig. 4, as appears from Fig. 3, is, during the aforesaid closure of switch zs, coupled to shaft 14 of the recorder mechanism for readjustment to correct for the zero drift as detected by galvanometer G.

The system shown in Fig. 4 also provides for restandardization of the current through slidewire S whose scale is calibrated for a particular standard current value. When the movable elements of switches W1, W2, which may be in the form of a double-pole, double-throw switch, are in the position shown in Fig. 4, the galvanometer G, as previously described, is connected between contacts RC and BC of resistances R and R1; when the movable elements of these switches are depressed from the position shown in Fig. 4, the galvanometer G is connected in series with the standard cell SD and resistance SR traversed by current, a definite proportion of which traverses slidewire S. For the correct or standard value of the slidewire current, the voltage drop across resistance SR is equal to the voltage of the standard cell SD which is connected in opposition thereto with consequent null deflection of galvanometer G. If the galvanometer G does deflect when switches W1, W2 are depressed, the resistance R6 is readjusted until null deflection of galvanometer G is obtained.

By addition of auxiliary mechanism SM, Fig. 3, the galvanometer G and the mechanical relay mechanism of the recorder is utilized periodically to check the current through slidewire S and to adjust resistance R6, if necessary, to restore the slidewire current to its standard value. The mechanism SM is similar to mechanism ZM, previously described, and need not be separately described; corresponding elements are identified by like reference characters with addition of subscript a.

The angular relations of cam 34a and slotted disk 29a of current standardizing mechanism SM to cam 34 and slotted disk 29 of the zero reset mechanism ZM are such that the cycles of these mechanisms are non-concurrent.

The system shown in Fig. 5 for measuring frequency is in general similar to that described and claimed in Wunsch Patents 1,751,538 and 1,751,539. The source of current or voltage whose frequency is to be measured is connected by conductors 61, 62 for inclusion in one conjugate arm of the frequency-responsive bridge N; the movable coil G of an alternating current galvanometer is connected in the other conjugate arm of the bridge and in response to unbalance of the bridge effects through mechanical relay mechanism, such as shown in Fig. 2, adjustment of slidewires S and S1, mounted on common shaft 14, with respect to their contacts CS, CS1.

To check the zero of the detector which, in this system, is the galvanometer G, the switch ZS is opened to apply zero input from the line 61, 62 to the bridge N. Under this circumstance, the galvanometer pointer 6 should be in its neutral or true zero position; actually it may be to one side or the other of its true zero because of any one or more of several conditions, such as misadjustment of the torque suspension system for the movable coil, magnetic impurities on the coil, gravitational unbalance of the movable system of the galvanometer, linkage between the galvanometer circuit and stray fields.

Opening of switch ZS does not interrupt the excitation current through the field coil FG of the galvanometer and the phasing resistance R1, nor does it disconnect the galvanometer from the bridge. Consequently, the field coil and movable coil of the galvanometer comprise a transformer; if the movable coil G is not in its neutral position, the current induced in it reacts with the field to effect further deflection of the movable coil.

To afford an electrical biasing effect which can be adjusted to reset the galvanometer coil G to its true zero, there is provided a transformer T whose secondary is connected in series with coil G in the conjugate arm of the bridge and whose primary is connected between the variable contact of resistance R1 and an intermediate tap of resistance FR in shunt thereto in circuit with the field coil FG of the galvanometer. While switch ZS is open, the contact BC of resistance R1 is adjusted to vary the extent and sense of the biasing voltage interjected by transformer T into the circuit of the galvanometer coil G in opposition to the voltage induced in coil G until there is null deflection of the galvanometer.

When switch ZS is reclosed, the detector is then in condition for accurate measurement of frequency. The biasing current or adjustment in its magnitude does not affect the subsequent measurements because when the bridge is balanced, the only currents then in the conjugate arm, including the galvanometer, to which the galvanometer is sensitive are those which present during the period of zero reset.

The operation of switch ZS and adjustment of slidewire R1 of Fig. 5 may be effected automatically by the mechanism disclosed in Fig. 3 and previously described. For the purposes of the system of Fig. 5, the mechanism SM of Fig. 3 is not used and may be omitted.

The system shown in Fig. 6 also uses a galvanometer as a detector, and provides for adjustment of an electrical bias to compensate for drift of the mechanical zero of the galvanometer from true zero. As distinguished from Fig. 5, the galvanometer of Fig. 6 is a direct current instrument.

When the movable contact of switch ZS is thrown to the right from the position shown in Fig. 6, the galvanometer G is disconnected from the thermocouple TC, or other source for producing a voltage varying as a function of a condition under measurement, and also from the unbalanced bridge or split-circuit potentiometer P, including the slidewire S; consequently, no input is applied to the galvanometer which remains, however, connected to the biasing network BN comprising the slidewire R1 and the tapped resistance R7 in shunt thereto. If the galvanometer deflection is not zero for this position of switch ZS, the slidewire R1 is correspondingly adjusted, in proper direction and to proper extent, to attain that end.

When the position of contact BC is such that its potential is the same as that of tap 63 of resistance R7, there is no electrical bias imposed upon the galvanometer; movement of contact BC from that position produces an electrical bias whose polarity depends upon the direction of the movement of contact BC. The zero compensating arrangement is, therefore, capable of correcting zero drift of the galvanometer in either sense from true zero.

The biasing network is energized from any suitable source of current, as battery B3, which may be connected to terminals XX; preferably a resistance R8 is connected in series with network BN to reduce the voltage drop across the slidewire and thus afford less critical adjustment of contact BC when only small maximum bias is necessary. In Fig. 6, the battery B3 is connected in series with adjustable resistance R9 and resistance R10 whose terminals are connected to points XX. Resistance R9 is adjustable to predetermine the total voltage across slidewire S available for biasing purposes and may be adjusted from time to time as the voltage of battery B3 decreases; such decrease, however, does not affect the accuracy of the measurements until, as after a long period of time, it becomes so large that the bias available from slidewire R1 is insufficient to correct for the zero drift. This insufficiency is apparent because resistance R1 will be at a limit of its adjustment, indicating need for a new battery or readjustment of resistance R9.

Since the voltage necessary for the biasing network is usually very small, the battery B3 may be replaced, as appears from Fig. 6a, by a thermocouple TG connected to terminals XX of the biasing network and disposed adjacent or in contact with some body of elevated temperature, for example and preferably, the motor M (Figs. 1 and 6a) utilized to drive the recorder mechanism.

In any event, whatever may be the source of biasing voltage, the switch ZS is intermittently operated, as by mechanism ZM of Fig. 3, to disconnect the galvanometer from the network P, and slidewire R1 is thereupon adjusted, as by mechanism ZM, to vary the biasing current in response to deflection of the galvanometer, thus to reset the galvanometer to the true zero of the recorder. At the end of each zero-reset period, the mechanism ZM operates to disengage operating disk 40 of slidewire R1 from driving disk 15b on shaft 14 of the relay mechanism and to close switch ZS in its other circuit position, shown in Fig. 6, thus reestablishing the normal circuit connections for which galvanometer G controls the slidewire S to maintain balance between the voltage of thermocouple TC and the potentiometer voltage; the biasing voltage from network BN does not affect this balance because it, in effect, is balanced against the force which otherwise would produce zero deflection of the galvanometer for some unbalance between the thermocouple and potentiometer voltages.

In the systems of Figs. 5 and 6, a shift from the mechanical zero of the galvanometer coil or pointer is corrected by provision of a variable biasing current through the galvanometer coil; in the arrangement shown in Figs. 7 to 9, the mechanical zero of the coil or pointer of galvanometer G is intermittently reset to true zero by adjustment of the mechanical suspension system for the movable coil G.

Referring to Fig. 7, the coil G is supported in position by the usual thin suspension wires or ribbons 64, 65; the upper end of the lower suspension 65 is held to the coil form by set-screw 66 and its lower end is fastened in the lower torsion head 67 carried by resilient arm 68 fastened by screw 69 to frame member 70. The lower end of the upper suspension 64 is held to the coil form by screw 71 and the upper end is fastened to the upper suspension head 72 rotatably received by flexible plate 73 and having a shoulder 74 abutting the upper surface of the plate. The vertical position of coil G and the tension of the suspensions 64, 65 is adjustable by screws 71, 71a which pass respectively through resilient arms 68, 73 threadably to engage the body member 70 of the galvanometer coil unit.

The angular position of coil G is adjustable by thumb-screw 75 which threadably engages the upstanding extension 76 of plate 73; the reduced end 77 of screw 75, as shown in Fig. 8, passes through a hole in the arm 78 fastened to the upper suspension head 72 and through the fixed guide 79 extending upwardly from plate 73. A spring 80 between guide 79 and arm 78 forces the latter continuously against the shoulder formed by the enlarged or threaded portion of screw 75.

Figure 10:
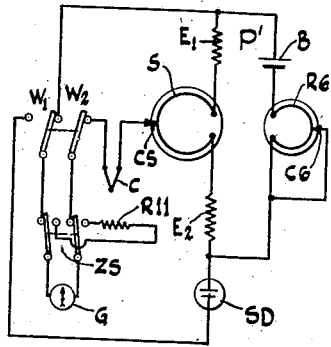
Fig. 10 illustrates a measuring system utilizing the mechanism of Figs. 7–9.

The screw member 75 is coupled as by flexible cable 81 to the shaft of disk 40b (Fig. 8) which, from time to time, is brought into engagement with disk 15a on shaft 14 of the recorder for adjustment in response to any deflection of the galvanometer pointer 6 from its true zero position; substantially at the beginning of each zero-resetting period the switch ZS, Fig. 10, disconnects the galvanometer coil G from the measuring circuit P' and shunts it by a damping resistance R11 of suitably low magnitude quickly to bring the movable coil to rest.

The mechanism ZM', Figs. 7 to 9, which effects intermittent engagement of disk 40b with disk 15a and controls switch ZS is similar to that disclosed, for another purpose, in Squibb Patent #1,935,732 to which reference is made for constructional details. In brief, gear 26, Figs. 2 and 8, is driven by shaft 4 of the recorder mechanism at suitably low speed, for example, one revolution in ninety seconds; for each revolution, the one-tooth gear 82 on the same shaft as gear 26, advances the gear 83 one step or tooth. Gear 83 is carried by extension 84 of a supporting member 85 pivoted at 86 to the recorder framework.

When the high-tooth of gear 83 (similar to gear 83a, Fig. 9) is engaged by the tooth of gear 82, the member 85 is rocked to effect engagement of disk 40b with the rim 15a of the slidewire disk 15. The shaft 88 of disk 40b is connected at one end to cable 81 for effecting adjustment of screw member 75 to reset the galvanometer to its true zero and at its other end is provided with a dial 89 for indicating the position of the upper suspension head 72 of the galvanometer.

When gear 83 is rocked as above described, its rear face engages the roller 90 carried by lever 91 and forces it against operating member 92 of switch ZS, moving the movable contacts to the right, as viewed in Fig. 10, to disconnect the galvanometer from the measuring circuit and to connect it across the damping resistor R11. If the galvanometer pointer 6 is not in its true zero position, the mechanical relay mechanism effects, as above described, one or more steps of angular displacement of shaft 14 which, through disk 15a, disk 40b, cable 81 and adjusting screw 75, is communicated to the upper torsion head 72 of the galvanometer to reset the pointer. At the end of the zero resetting period, occurring when the high-tooth of gear 83 is disengaged from the tooth of gear 82 by continued rotation of the latter, the frame 85 is returned to its original position, as by spring 95, thereby effecting disengagement of disk 40b with disk 15a and moving the movable contacts of switch ZS, Fig. 10, to the left to reconnect the galvanometer to the measuring circuit P' and to disconnect it from resistor R11.

Preferably, shortly after or immediately following each zero-resetting period, the current through slidewire S, Fig. 10, is checked and if not of the standard value for which the slidewire is calibrated, the resistance R6 is varied to readjust the slidewire current. The mechanism SM' for that purpose, Figs. 8 and 9, is similar to that disclosed in the aforesaid Squibb patent for like purpose. The connections of switch W1, W2 of mechanism SM' are shown in Fig. 10.

In brief, preferably shortly after the mechanism ZM' has reset the galvanometer to its true zero, as above described, the frame 85a of mechanism SM' is rocked by engagement of the tooth of gear 82a with the high tooth 83a to effect engagement of the periphery of disk 40a which carries the slidewire R6, with the periphery of disk 15a on the controlled shaft 14 and to move the movable contacts of switch W1, W2, to the left, as viewed in Fig. 10. The operation of the switch disconnects the galvanometer from the thermocouple TC, or equivalent condition responsive device, and connects it in series with the standard cell SD across the slidewire S, and its end coils E1, E2. If the slidewire current is not of standard value, the galvanometer G deflects and through the relay mechanism effects adjustment of slidewire R6 whose operating disk 40a is, at this time, in engagement with disk 15a on controlled shaft 14; the adjustment of slidewire R6 with respect to its contact C6 is effected in one or more steps and stops when null deflection of the galvanometer indicates the slidewire current has been restored to its standard value.

At the end of the current standardizing period, disengagement of the high tooth 87a of gear 83a from the tooth of gear 82a permits frame 85a to rock in counterclockwise direction to separate disk 40a from disk 15b, Fig. 8, and substantially concurrently the movable contacts of switch W1, W2 are moved to the right, as viewed in Fig. 10, to disconnect the galvanometer from the standard cell SD and reconnect it to the thermocouple TC, or other source for producing a voltage varying as a function of the condition under measurement.

The mechanisms disclosed in Fig. 8 provide, from time to time, a check, by the apparatus or system itself, of the zero of its detector and automatic reset thereof to true zero and a check, by the apparatus itself, of the slidewire current and automatic restandardization thereof. At any time, however, an operator may check and cause adjustment of the zero of the galvanometer by pushing button MZ, Fig. 8, to rock the frame 85 and thus operate switch ZS and move disk 40b into engagement with disk 15a; if the detector zero is incorrect, the application of zero input causes the pointer to be clamped in position away from its true zero, whereupon the relay mechanism operates, as above described, automatically to readjust screw member 75. The operator releases the button when shaft 14 is no longer stepped by the relay mechanism. Similarly, at any time, the operator may, by pushing button MS, cause the mechanism SM' to cooperate with the relay mechanism for automatic standardization of the slidewire current; the slidewire current should be standardized after the zero of the galvanometer has been reset to true zero, otherwise, the slidewire current, as adjusted during the standardizing period will be in error by an amount varying with the zero shift of the galvanometer and all measurements will be in error to that extent.

For brevity in the appended claims, the expression "zero input" to the detector is to be understood to mean there is prevented influence upon the detector of the effect to which it responds in making measurements of the condition under measurement; it does not mean, for example, the excitation current, or voltage, as the field current of an alternating current galvanometer, or the normally fixed voltages applied to the electrodes of a tube, are reduced to zero.

While I have specifically described and illustrated various systems and mechanisms, it is to be understood that my invention is not limited thereto but is coextensive in scope with the appended claims.

What I claim is:

1. The combination with a detector responsive to electrical energization, of means for decreasing the drift of said detector from true zero, means for deenergizing said detector, and means controlled by said detector for actuating said first-named means during deenergization of said detector for substantially eliminating its drift.

2. A system comprising a detector whose input varies with changes in magnitude of a condition, means adjustable to vary the zero of said detector, and means operable to apply zero input to said detector and to actuate said adjustable means in response to any deviation from the true zero of said detector.

3. An arrangement comprising a normally balanced system including a detector responsive to unbalance thereof, relay means controlled by said detector normally to effect rebalance of said system, means adjustable to vary the zero of said detector, and means operable to apply zero input to said detector and to coupled said adjustable means to said relay means.

4. An arrangement comprising a balanceable system including a detector responsive to unbalance thereof, relay means controlled by said detector normally to rebalance said system, means adjustable to vary the zero of said detector, and means operable to apply zero input to said detector and to couple said adjustable means to said relay means for adjustment thereby in accordance with any deviation from the true zero of said detector.

5. A system comprising a normally balanced electrical network including a detector responsive to unbalance thereof, controlled structure, relay mechanism for actuating said controlled structure in accordance with the response of said detector, means adjustable to vary the zero of said detector, and means operable to apply zero input to said detector and to couple said adjustable means to said relay mechanism.

6. A system comprising a normally balanced network, means for detecting unbalance of said network including a thermionic tube and an electro-responsive device in the output system thereof, impedance means adjustable to determine the zero of said detecting means, and means operable to apply zero input to said tube and to adjust said impedance means in response to any deviation from the true zero of said electro-responsive device.

7. A system comprising a normally balanced network, means for detecting unbalance of said network including a thermionic tube and a deflection instrument in the output system thereof, impedance means adjustable to determine the zero of said detecting means, and means operable to apply zero input to said tube and to adjust said impedance means in response to any deflection of said instrument from its true zero.

8. A system comprising a normally balanced network, means for detecting unbalance of said network comprising a thermionic tube, controlled structure, relay mechanism for actuating said controlled structure in accordance with the response of said detecting means, impedance means adjustable to vary the zero of said detecting means, and means operable to apply zero input to said tube and to couple said relay mechanism to said adjustable impedance means.

9. A system comprising a normally balanced network, means for detecting unbalance of said network including a thermionic tube and a deflection instrument in the output system thereof, controlled structure, relay mechanism for actuating said controlled structure in accordance with the deflection of said instrument, impedance means adjustable to vary the zero of said detecting means, and means operable to apply zero input to said tube and to couple said adjustable impedance means to said relay mechanism.

10. A system comprising a galvanometer normally responsive to changes in magnitude of a condition, means adjustable to vary the zero of said galvanometer, and means operable to apply zero input to said galvanometer and to actuate said adjustable means in response to any deviation from the true zero of said galvanometer.

11. A system comprising a normally balanced network, a galvanometer normally responsive to unbalance of said network, controlled structure, relay mechanism for actuating said controlled structure in accordance with the deflection of said galvanometer, means adjustable to vary the zero of said galvanometer, and means operable to apply zero input to said galvanometer and substantially concurrently to couple said adjustable means to said relay mechanism for adjustment in accordance with any deviation from the true zero of the galvanometer.

12. A system comprising a normally balanced network, a galvanometer responsive to unbalance of said network, controlled structure, relay mechanism for actuating said controlled structure in accordance with the deflection of said galvanometer, impedance means adjustable to vary the zero of said galvanometer, and means intermittently operable to apply zero input to said galvanometer and substantially concurrently to couple said adjustable impedance means to said relay mechanism for adjustment in accordance with any deviation from the true zero of the galvanometer.

13. A system comprising a detector normally responsive to changes in magnitude of an electrical effect, an electrical network providing a biasing voltage determinative of the zero of said detector, means adjustable to vary the effective magnitude of said voltage, and means operable to apply only said biasing voltage to said detector and substantially concurrently to actuate said adjustable means in accordance with any deviation from the true zero of the detector.

14. A system comprising a network unbalanced upon change in magnitude of a condition, a galvanometer having a member deflecting in response to unbalance of said network, a second network providing a biasing voltage determinative of the zero of said galvanometer, impedance means adjustable to vary the effective magnitude of said biasing voltage, and means operable to apply only said biasing voltage to said galvanometer and to actuate said adjustable means in response to deflection of said member to reset said galvanometer to true zero.

15. A measuring network including a galvanometer, controlled structure, relay mechanism for actuating said controlled structure in accordance with the deflections of said galvanometer, a motor for said relay mechanism, means for deriving from operation of said motor a biasing voltage determining the zero of said galvanometer, means adjustable to vary the effective magnitude of said voltage, and means intermittently operated by said motor to effect application of only said biasing voltage to said galvanometer and to couple said adjustable means to said relay mechanism to effect resetting of the galvanometer to its true zero.

16. A measuring system comprising a galvanometer having a movable element mechanically biased to neutral position, and means operable to apply zero input to said galvanometer and substantially concurrently to vary the magnitude of the bias in response to deviation of said element from its true neutral position.

17. A system comprising a detector having a member movable from a neutral position in response to changes in magnitude of a condition, controlled structure, relay mechanism for actuating said controlled structure in accordance with deviation of said member from neutral position, means adjustable to determine the position assumed by said member for zero input to the detector, and means operable to apply zero input to the detector and thereupon to effect adjustment, by said relay mechanism, of said adjustable means in accordance with any deviation of said member from said neutral position.

18. A system comprising a galvanometer having a deflecting member, adjustable means for biasing said deflecting member to a neutral position, a network unbalanced upon change in magnitude of a condition to effect deflection of said galvanometer, controlled structure, relay mechanism for actuating said controlled structure in accordance with deviation of said deflecting member from neutral position, switching means operable effectively to disconnect said galvanometer from said network and apply zero input thereto, and means operable substantially concurrently with said switching means to couple said adjustable means for actuation by said relay mechanism.

19. A potentiometer system comprising detecting means, means adjustable to standardize the potentiometer current, means adjustable to determine the zero of said detecting means, and means intermittently operable to apply zero input to said detecting means and sequentially to effect adjustment of said zero adjusting means and of said standardizing means.

20. A potentiometer system comprising detecting means normally responsive to changes in magnitude of a condition, controlled structure, relay mechanism for actuating said controlled structure in accordance with the response of said detecting means, means adjustable to determine the zero of said detecting means, means adjustable to standardize the potentiometer current, and means operable to apply zero input to said detecting means and sequentially to couple said two adjusting means to said relay mechanism.

21. A potentiometer system comprising detecting means responsive to changes in magnitude of a condition, controlled structure, relay mechanism for actuating said controlled structure in accordance with the response of said detecting means, means adjustable to standardize the potentiometer current, means adjustable to determine the zero of said detecting means, and means operable to apply zero input to said detecting means and to couple said adjustable means to said relay mechanism for automatic resetting of the zero of said detecting means, and thereafter to couple said first adjustable means to said relay mechanism for automatic restandardization of the potentiometer current.

22. A measuring system comprising a detector responsive to an effect varying with changes in magnitude of the condition under measurement, means operable to prevent influence upon said detector of said effect, means for ascertaining, while said detector is immune to said effect, the extent of departure of its zero from true zero, and means responsive to said departure to readjust said detector to its true zero.

23. In a null type measuring system comprising a detector, the method which comprises intermittently applying zero input to the detector, during intervals of zero input, producing an effect whose sense and magnitude are in accord with the sense and extent of departure of the zero of said detector from true zero, and adjusting the zero of said detector in accordance with the sense and magnitude of said effect.

24. An arrangement comprising a balanceable system including a detector responsive to unbalance thereof, a relay system controlled by said detector normally to rebalance said system, means adjustable to vary the zero of said detector, and means operable to apply zero input to said detector and to associate said adjustable means with said relay system for adjustment thereby in accordance with any deviation from the true zero of said detector.

25. A measuring system comprising a normally balanced network, means for detecting unbalance of said network including a thermionic tube and an electro-responsive device in the output system thereof, recorder mechanism controlled by said device, relay means adjacent said tube and operable to apply zero input thereto, and means intermittently actuated by said recorder mechanism for controlling energization of said relay means.

26. In combination, a glass electrode, a thermionic tube, a conductor connecting the glass electrode to the grid of the tube, indicating means in remote relation to said tube, a cable adapted to connect the plate of the tube to said remote indicating means, means adjacent said tube operable for rendering said tube effective and ineffective, and control means adjacent said indicating means for actuating said operable means.

27. In combination, a glass electrode, a thermionic tube, a conductor connecting the glass electrode to the grid of the tube, a relay adjacent said tube, a conductor adapted to be connected to said grid by said relay, conductors for controlling said relay, conductors connected to said tube, and a unit in remote relation to said tube and relay comprising indicating means connected to said tube by said last named conductors, and means, adjacent said indicating means, for energizing and deenergizing said relay connected thereto by aforesaid relay-controlling conductors.

28. In an apparatus for measuring hydrogen ion concentration, in combination, a glass electrode, a thermionic tube, a conductor connecting said electrode to the grid of the tube, a relay adjacent said tube, an independent unit including a potentiometer and means for actuating said relay, and connections to said unit including a circuit adapted to connect said potentiometer to the cathode of the tube and to said electrode, said relay being adapted to eliminate the glass electrode and the potentiometer from the circuit.

29. In an apparatus for measuring hydrogen ion concentration, in combination, a glass electrode, a thermionic tube, a relay in close proximity thereto, a conductor connecting said glass electrode to the control electrode of the tube, a control unit comprising electrical devices for indicating electric effects and a variable potentiometer, and connections to said control unit including conductors establishing a circuit including said electrodes and said potentiometer, and means in the control unit for controlling the relay, said relay being adapted to eliminate the glass electrode and potentiometer from said circuit.

30. In an apparatus for measuring hydrogen ion concentration, in combination, a glass electrode, a thermionic tube, a relay in close proximity thereto, a conductor connecting said glass electrode to the control electrode of the tube, a control unit comprising electrical devices for indicating electric effects, a measuring potentiometer and a standardizing potentiometer, and connections to said unit including conductors establishing a circuit including said electrodes and said potentiometers, and means in the control unit for controlling the relay, said relay being adapted to eliminate the glass electrode and measuring potentiometer from said circuit.

31. In an apparatus for measuring hydrogen ion concentration, in combination, a glass electrode, a thermionic tube, a circuit-changing means adjacent thereto, a conductor connecting the glass electrode to the control electrode of the tube, a further conductor, said circuit-changing means being adapted to connect said first-named conductor to said further conductor, and means remote from the glass electrode for actuating the circuit-changing means.

32. In an apparatus for measuring hydrogen ion concentration, in combination, a glass electrode, a thermionic tube, a relay adjacent thereto, a conductor connecting the glass electrode to the control electrode of the tube, a conductor adapted to be connected to the control electrode of the tube by said relay, and conductors connected to said relay to energize the same.

33. Apparatus for measuring hydrogen ion concentration comprising test apparatus, a control unit, and connections connecting said test apparatus to said control unit, said test apparatus including a glass electrode, a reference half cell adapted with the liquid to be tested to constitute a cell, a thermionic tube remote from said control unit, a conductor connecting said glass electrode to the thermionic tube so as to control the plate current of said tube, said control unit including a plurality of variable voltage supplying means, calibrated means for controlling one of said variable voltage supplying means, a galvanometer, means tending to supply opposite current to the galvanometer, said connections comprising conductors connecting said cell and said plurality of variable voltage supplying means in circuit, a conductor for short-circuiting last said variable voltage supplying means and said cell in last said circuit, and conductors for supplying the plate current to said galvanometer.

34. In an apparatus for measuring hydrogen ion concentration, in combination, test apparatus, a control unit, and connections connecting said apparatus to said control unit, said test apparatus including a glass electrode, a reference half cell adapted to cooperate with the liquid being tested to provide a voltage producing cell, and a thermionic tube remote from said control unit, said control unit including means for supplying a plurality of voltages, a resistance and a galvanometer, said connections including a conductor adapted to connect the plate of said tube to said galvanometer, said resistance and to one of said means for supplying voltage, and conductors completing a circuit including the grid and plate of said tube, said cell and a plurality of said voltage supplying means, and a conductor for short-circuiting said cell and one of said voltage supplying means out of last said circuit.

35. The combination with test apparatus comprising a glass electrode, a thermionic tube, and a lead connecting the glass electrode to the control electrode of the tube, of measuring means, including indicating means, remote from said tube, conductors from said test apparatus to said measuring means, means adjacent said tube operable to render said tube ineffective and effective, and control means adjacent said remote measuring means for actuating said operable means.

36. Apparatus for measuring ion concentration comprising a glass electrode, a thermionic tube, a lead connecting said glass electrode to the control electrode of said tube, a relay adjacent said tube, a conductor connected to the control electrode of the tube by said relay, and conductors connected to said relay to energize the same.

37. In an apparatus for measuring ion concentration, in combination, a glass electrode, a thermionic tube, a conductor connecting said glass electrode to the control electrode of the tube, a circuit including in series, a measuring potentiometer and a standardizing potentiometer connecting said glass electrode to the cathode of said tube, said potentiometers being located in remote relation to said thermionic tube, and a relay located adjacent said tube and controlled adjacent said potentiometers for eliminating the glass electrode and measuring potentiometer from said circuit.

38. In combination, a glass electrode, a thermionic tube, a lead connecting said glass electrode to the control electrode of said tube, indicating means remote from said tube, conductive means connecting the anode of said tube to said remote indicating means, means adjacent said tube operable to prevent or permit effect upon its control electrode of the potential of said glass electrode, and control means adjacent said indicating means for actuating said operable means.

39. In combination, test apparatus comprising a glass electrode, a thermionic tube, a lead connecting said glass electrode to the control electrode of said tube, a relay adjacent said tube, a conductor adapted to be connected to said control electrode by said relay, conductors for controlling said relay, conductors connected to said tube, measuring means including indicating means remote from said tube and connected apparatus by said conductors, and means adjacent said indicating means for energizing and deenergizing said relay.

40. In an apparatus for measuring ion concentration, in combination, test apparatus comprising a glass electrode, a thermionic tube, a lead connecting said glass electrode to the control electrode of the tube, and a relay, measuring-control apparatus including a measuring potentiometer and means for controlling actuation of said relay, and conductors between said test apparatus and said measuring-control apparatus including a circuit adapted to connect said potentiometer to the cathode of the tube and to said glass electrode, said relay being adapted to eliminate the glass electrode and said potentiometer from the circuit.

41. In an apparatus for measuring ion concentration, in combination, apparatus comprising a glass electrode, a thermionic tube, and a lead connecting said glass electrode to the control electrode of said tube, control apparatus comprising electrical devices for indicating electric effects and a variable potentiometer, conductors between said first-named apparatus and said control apparatus including conductors establishing a circuit including said glass electrode and said potentiometer and connecting to the cathode of said tube, a relay adjacent said tube and remote from said control apparatus, and means in said control apparatus for controlling the relay, said relay being adapted to eliminate the glass electrode and said potentiometer from said circuit.

42. In apparatus for measuring ion concentration, in combination, apparatus comprising a glass electrode, a thermionic tube, a relay in close proximity thereto, and a lead connecting said glass electrode to the control electrode of said tube, control apparatus comprising electrical devices for indicating electric effects, a measuring potentiometer and a standardizing potentiometer, conductors between said first-named apparatus and said control apparatus including conductors establishing a circuit including said electrode and said potentiometers and connecting to the cathode of the tube, and means in the control apparatus for controlling the relay, said relay being adapted to eliminate the glass electrode and measuring potentiometer from said circuit.

43. Apparatus for measuring ion concentration comprising test apparatus, control apparatus, and conductors connecting said test apparatus to said control apparatus, said test apparatus including a glass electrode, a reference half cell adapted with the liquid to be tested and said glass electrode to constitute an ion-concentration cell, a thermionic tube remote from said control apparatus, a lead connecting said glass electrode to the thermionic tube so as to control the anode current of said tube, said control apparatus including a plurality of variable voltage supplying means, calibrated means for controlling one of said variable voltage supplying means, a galvanometer, means tending to supply opposite current to the galvanometer, said conductors including conductors connecting said cell and said plurality of variable voltage supplying means in circuit, a conductor for short-circuiting said last variable voltage supplying means and said cell in said last circuit, and conductors for supplying said anode current to said galvanometer.

44. In an apparatus for measuring ion concentration, in combination, test apparatus, control apparatus in remote relation thereto, and conductors connecting said first-named apparatus to said control apparatus, said test apparatus including a glass electrode, a reference half cell adapted to cooperate with the liquid being tested and said glass electrode to provide a voltage producing cell, and a thermionic tube remote from said control apparatus, said control apparatus including means for supplying a plurality of voltages, a resistance, and a galvanometer, said conductors including a conductor adapted to connect the anode of said tube to said galvanometer, said resistance, and to one of said means for supplying voltage, and conductors completing a circuit including the control electrode and anode of said tube, said cell, and a plurality of voltage supplying means, and a conductor for short-circuiting said cell and one of said voltage supplying means out of said last-named circuit.

ALBERT J. WILLIAMS, Jr.